United States Patent [19]

Sheldon et al.

[11] Patent Number: 4,721,010
[45] Date of Patent: Jan. 26, 1988

[54] DIFFERENTIAL DRIVE ARRANGEMENT

[75] Inventors: Anthony J. Sheldon, Freshwater; Anthony P. R. Rolt, Stratford-on-Avon, both of Great Britain

[73] Assignee: Harry Ferguson Limited, London, England

[21] Appl. No.: 939,251

[22] Filed: Dec. 5, 1986

Related U.S. Application Data

[63] Continuation of Ser. No. 661,134, Oct. 15, 1984, abandoned, which is a continuation-in-part of Ser. No. 390,526, Jun. 21, 1982, abandoned.

[30] Foreign Application Priority Data

Jun. 26, 1981 [GB] United Kingdom ............... 8119769
Feb. 12, 1982 [GB] United Kingdom ............... 8200419

[51] Int. Cl.⁴ .................................................. F16H 35/04
[52] U.S. Cl. ................................... 74/650; 74/665 T; 74/710.5
[58] Field of Search ............... 74/710.5, 650, 655, 74/665 A, 665 R, 665 C, 665 F, 665 H, 665 V; 192/20, 21, 58 B, 58 C, 49; 180/248

[56] References Cited

U.S. PATENT DOCUMENTS

| | | | |
|---|---|---|---|
| 1,552,305 | 9/1925 | Hulett | 74/650 |
| 1,576,229 | 3/1926 | Seidel | 74/650 |
| 2,335,544 | 11/1943 | Schnetzer | 192/49 X |
| 2,397,673 | 4/1946 | Lewis | 74/650 X |
| 2,468,107 | 4/1949 | Powell | 74/650 |
| 2,549,557 | 4/1951 | Yancho et al. | 74/650 |
| 2,827,802 | 3/1958 | Burke | 74/650 |
| 3,396,605 | 8/1968 | Wilkinson et al. | 74/650 |
| 4,290,321 | 9/1981 | Wilson | 74/710.5 X |

FOREIGN PATENT DOCUMENTS 1357106 6/1974 United Kingdom.

Primary Examiner—Leslie Braun
Assistant Examiner—Dwight G. Diehl
Attorney, Agent, or Firm—Pearne, Gordon, McCoy & Granger

[57] ABSTRACT

A motor vehicle four-wheel-drive transmission employs an interwheel differential gear in a first axle, and solely viscous fluid coupling device in a second axle for differential transmission of drive to the road wheels of the second axle only when a speed-difference is established between the first and second road wheels, the two axles being mutually in direct driving connection through respective propeller shafts commonly driven by a change-speed box. In one arrangement of axle with a viscous fluid coupling device, a crown wheel is mounted co-axially on a housing of such coupling device from which nearside and offside half-shafts extend driven by separate sets of "inner" annular plates interleaved with those of an "outer" set of annular plates driven by the housing. In another similar arrangement, two separate viscous fluid couplings are used, the housings thereof being driven by a common crown wheel.

14 Claims, 5 Drawing Figures

DIFFERENTIAL DRIVE ARRANGEMENT

This is a continuation of application Ser. No. 661,134, filed on Oct. 15, 1984, now abandoned, which was a continuation-in-part of application Ser. No. 390,526, filed June 21, 1982, now abandoned.

This invention relates to a vehicle drive transmission.

The invention is concerned particularly with transmission of drive to two or more mutually separate axles, the term "axle" having the meaning well understood in the automobile industry, namely an assembly providing final drive to one set of road wheels.

In the automobile industry, there is constant striving for improvements of any of the many aspects of vehicle performance; and, at the same time, commercial factors demand continual advance in manufacturing design so that such improvement may be achieved economically. Thus, the present invention has the objective of providing a new and improved vehicle drive transmission.

In four-wheel-drive transmissions for use on normal road surfaces, it has proved necessary to provide for differential action not only between the road wheels of each axle (interwheel differential action), but also between separate axles (interaxle differential action) in order to eliminate accumulative torsional stress ("wind-up") in the transmission shafts because such wind-up adversely affects vehicle handling and fuel consumption, promotes excessive tyre wear, and generally abuses the transmission components.

For positive transmission of drive to road wheels in contact with a normal dry road surface with provision for differential action, the most effective device in terms of function and of cost is a simple differential gear. In order to limit or control the freedom of action of a differential gear, whether interwheel or interaxle, it has been proposed to associate with the differential gear "limited-slip" or "controlled-slip" devices employing the restraining effect of viscous shear in a liquid in contact with mutually interleaved discs. In this context there is a conflict between allowing on the one hand sufficient freedom for normal differential action and applying on the other hand useful control or limitation of differential action. Improvement in the attainment of appropriate torque characteristics in a rotary coupling is the principal subject matter of our British Patent Specification No. 1 357 106. In that specification, we describe four-wheel-drive vehicle transmissions in which our improved control coupling is deployed in direct association with interaxle differential gears to limit the differential freedom of these gears; and we also describe an arrangement in which our improved coupling is disposed in a front propeller shaft (i.e. interaxle), but in the absence of an interaxle differential gear, so that only the rear axle could receive positive drive. Thus, the front wheels might tend to inhibit rear wheel spin if the front wheels retained adhesion and a significant speed-difference was established between front and rear wheels.

Attempts to find alternatives to limiting or controlling the action of a positive drive differential gear have been made. Proposals in this context generally seek to transmit drive differentially by means of friction and/or liquid dynamic action. A principal and persistent difficulty with such proposals have been the energy-wasteful generation of heat which is produced because some degree of continuous slip has always been accepted as inevitable during drive conditions.

According to the present invention, there is provided a vehicle drive transmission comprising first and second drive axle assemblies having respective drive input members and respective road wheels, drive means arranged for delivering drive simultaneously to each of said drive input members and with a fixed speed relation therebetween, differential gear means arranged in one of said drive axle assemblies for transmitting torque differentially and positively between the associated drive input member and the associated road wheels, and slip coupling means arranged in the other of said drive axle assemblies for transmitting torque between the associated drive input member and either associated road wheel when a speed difference exists between the said input member and such road wheel.

Further, according to the present invention, there is provided slip coupling means for use in a vehicle drive transmission as aforesaid, the slip coupling means comprising a housing defining an enclosure generally of hollow cylindrical configuration, three sets of annular plates in the housing, one of said sets being positively engaged for driving by the housing, the others of said sets being in positive driving connection respectively with the associated road wheels, the plates of the said other sets being freely interleaved with the plates of the said one set, and all of said plates being sealed within said enclosure in contact with a viscous fluid occupying a predetermined percentage less than the volume of space available for fluid within the housing.

In relation to the improved control coupling of our said British Patent Specification No. 1 357 106, we noted that it possessed a characteristic of reduced variation in torque values obtained during transient speed-differences or "snatch" operation. We have now gained the insight to realise that this characteristic is useful in the context of the present invention. The combination of a conventional differential gear type axle with an axle having solely viscous fluid coupling means for drive and differential action produces a transmission having the capability of four-wheel-drive, and additionally achieves manufacturing economy by dispensing with both an interwheel differential gear and with an interaxle differential device. The inherent shock-absorbing character of the viscous fluid enables further economy in that the transmission components generally may be designed for lighter duty since they would not be subject to shock loading.

Embodiments of the present invention will now be described, by way of example, with reference to the accompanying drawings in which.

Figure 1:
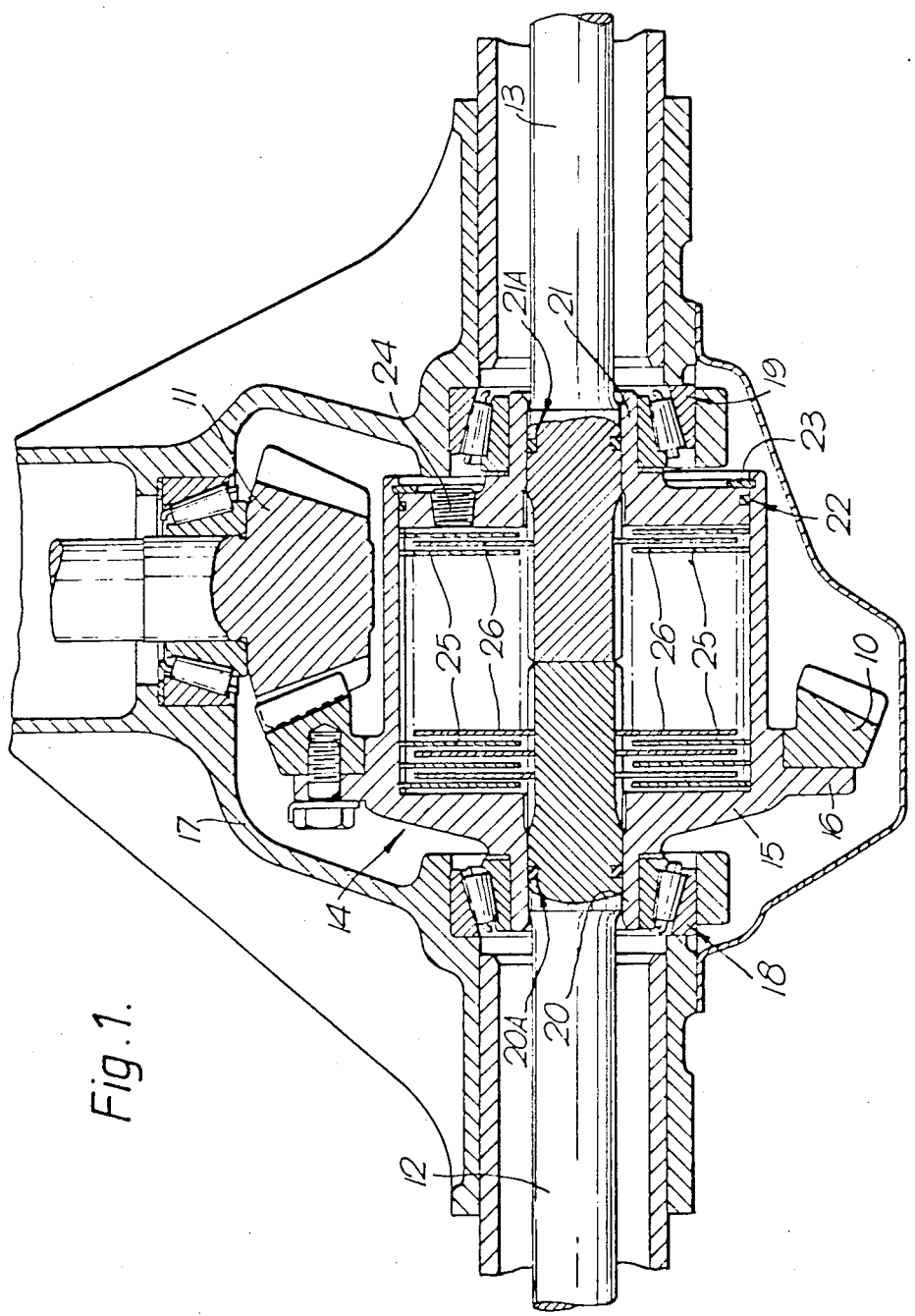
FIG. 1 is a part-sectional view in plan of part of a vehicle drive transmission in accordance with the present invention.
Figure 2:
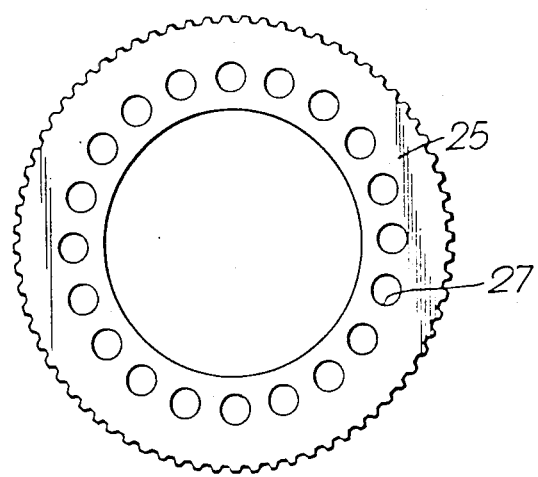
FIGS. 2 and 3 are elevational views to a slightly larger scale than FIG. 1 of annular plates incorporated in a viscous fluid coupling means shown in FIG. 1.
Figure 3:
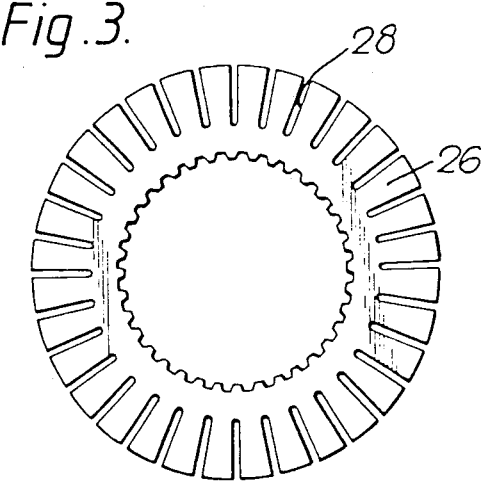

In FIG. 1, a crown wheel 10 and associated pinion gear 11 together constitute the final drive reduction gearing in a vehicle axle assembly in a conventional manner. Thereapart, the assembly is non-conventional in that driving torque delivered to respective road wheels (not shown) by way of half-shafts 12 and 13 is transmitted solely by way of viscous fluid coupling means indicated generally by reference numeral 14. The half-shafts 12 and 13 constitute two relatively rotatable members, and a third rotatable member is constituted by a housing 15 which is of hollow cylindrical configuration and has a flange 16 to which the crown wheel 10 is bolted. The axle assembly includes a principal casing 17 which rotatably carries the housing 15 by means of tapered roller bearings 18 and 19 which are coaxial with the shafts 12 and 13 and engage externally on short tubular lands 20 and 21 incorporating annular seals 20A and 21A through which the shafts 12 and 13 project rotatably. The right-hand end wall of the housing 15 is formed separately from the remainder of the housing and is provided with a sealing ring 22 and is held in position by means of a circlip 23. An opening occupied by a screwed plug 24 provides a means of introducing a viscous fluid into the interior of the housing 15 which is pressure-tight and fluid-tight when the plug 24 is in position. The viscous fluid coupling means incorporates three sets of annular plates within the housing 15. One of these sets consists of plates 25 (see FIG. 2) which engage the splines formed on the interior wall of the housing 15. The other two sets of annular plates are denoted by reference number 26 and are associated respectively with shafts 12 and 13. The plates 26 are as shown in FIG. 3 and engage splined inner end portions of the shafts 12 and 13. The plates 25 are termed 'outer' plates, and the plates 26 are termed 'inner' plates. Each of the outer plates is provided with a plurality of circular through openings 27, and each of the inner plates is provided with a plurality of open-ended slots 28. The openings 27 and the slots 28 constitute different surface configurations of the annular plates. It is envisaged that each individual annular plate of any of the three sets of plates may have faces with mutually different surface configurations. In addition to the annular plates, the housing 15 contains a viscous fluid which is preferably a silicone fluid, and preferably a dimethyl silicone fluid, which is introduced into the housing 15 through the opening accommodating the screwed plug 24.

General technical information as to the construction and operation of the viscous fluid coupling means is contained in our British Patent Specification No. 1 357 106. In the present case, where the axle assembly is intended for incorporation in the drive transmission of a passenger car of medium size, the following information provides a general indication of appropriate quantities and sizes. The viscosity of the fluid is envisaged as being of the order of 200,000 centistokes. The nominal diameter of the housing 15 is approximately 4 inches; the annular plates would provide approximately 80/90 working faces, and would have an average inter-plate spacing of 0.01 inches. The volume of viscous fluid within the housing 15 at approximately 25° C. would be between 10% and 14% less than the total volume of space available for fluid within the housing. The characteristics of such a coupling include an ability to transmit a relatively high value of torque immediately in response to slip being induced as in the context of a vehicle drive transmission. The annular plates may be free to shift axially; or they may be axially located by means of spacers as described in our British Patent Specification No. 1 357 106.

Figure 5:
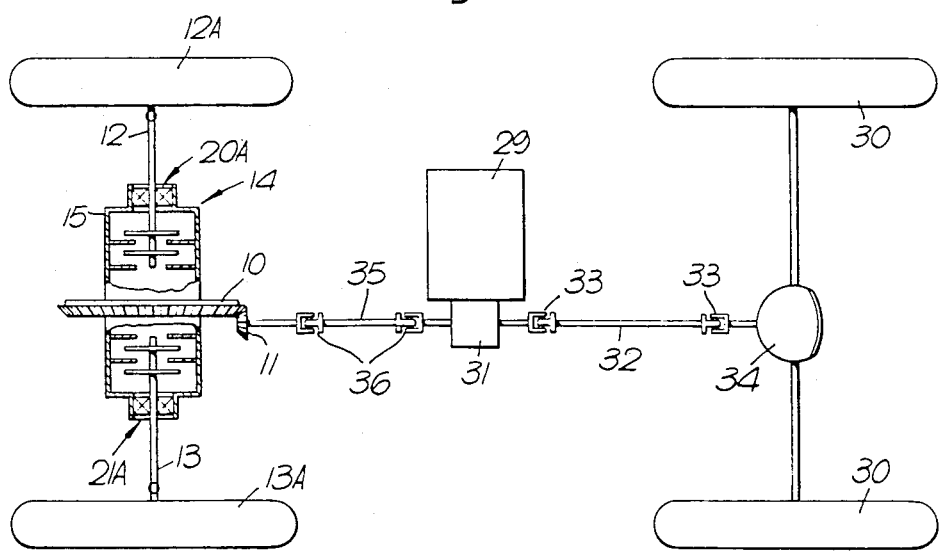
FIG. 5 is a diagramatic representation of the entire drive transmission in accordance with the present invention.

The axle assembly described with reference to FIG. 1 will be used in a vehicle drive transmission such as is illustrated in FIG. 5. In the FIG. 5 transmission, a motor 29 provides drive to a pair of rear wheels 30 by way of a gear box 31, propeller shaft 32 with universal joints 33, and a conventional final drive 34 incorporating a positive differential gear. The drive to the rear wheels 30 constitutes a positive drive. The gearbox 31 also provides drive to a front propeller shaft 35 with universal joints 36 to drive the pinion gear 11. The gear box 31 develops a fixed speed relation between the input to the final drive 34 of the rear axle and the pinion gear 11, being the input to the front axle. In FIG. 5, the axle assembly of FIG. 1 is represented diagramatically as driving front steerable road wheels 12A and 13A; and parts of the differential drive arrangement corresponding with those in FIG. 1 are given the reference numerals used in FIG. 1.

In the operation of the vehicle transmission of FIG. 5 incorporating the axle assembly of FIG. 1, normal straight ahead movement of the vehicle is by virtue of the positive drive to the rear wheels 30. The various transmission ratios including the crown wheel and pinion ratio and also including nominal road wheel diameters, are so selected that during straightahead motion of the vehicle the rotational speed of the housing 15 matches the rotational speeds of the half shafts 12 and 13. Thus, there is no differential action required within the front axle. During normal negotiation of road curves and corners, differential action of the rear wheels 30 is provided for by the differential gear in the final drive 34. Differential action of the front wheels 12A and 13A is provided for by slip between the interleaved plates within the housing 15. Normal differential action between vehicle road wheels is of a relatively low order in terms of rotational speed difference, and moreover the rate at which such rotational speed difference is established is also of a relatively low order. The viscous fluid coupling means of the differential drive arrangement is tolerant of the rotational speed differences associated with normal differential action and the power absorbed by the viscous fluid is not significant. Under drive, in the event that the rear road wheels 30 tend to spin, there is immediate acceleration of both of the propeller shafts 32 and 35 and therefore immediate acceleration of the crown wheel 10. This acceleration is sensed by the viscous fluid coupling means and immediately torque is transmitted differentially to the half shafts 12 and 13 and the vehicle transmission is converted from two-wheel-drive to transient four-wheel-drive. Because of the damping properties of the viscous fluid coupling means, the transient nature of the operation of the transmission is not objectionable; and it has been found that vehicle handling characteristics remain acceptable. In a similar manner, in the event of the rear road wheels 30 tending to lock during braking on a slippery road surface, any sudden deceleration of the propeller shafts 32 and 35 will be opposed by a transient transmission of torque through the viscous fluid coupling means from the half shafts 12 and 13, always assuming of course that the grip adhesion of the road wheels 12A and 13A is not instantly affected.

In the axle of FIG. 1, it can be seen that the gear ratio of the crown wheel and pinion provides a speed reduction. Thus, the viscous fluid coupling means, although required to transmit the higher driving torque as compared with the average propeller shaft torque, is subjected to smaller values of 'slip' attributable to departures from designed transmission ratios due to incorrect tyre pressures or the use of incorrect tyre sizes, unevenly worn tire treads etc.

Figure 4:
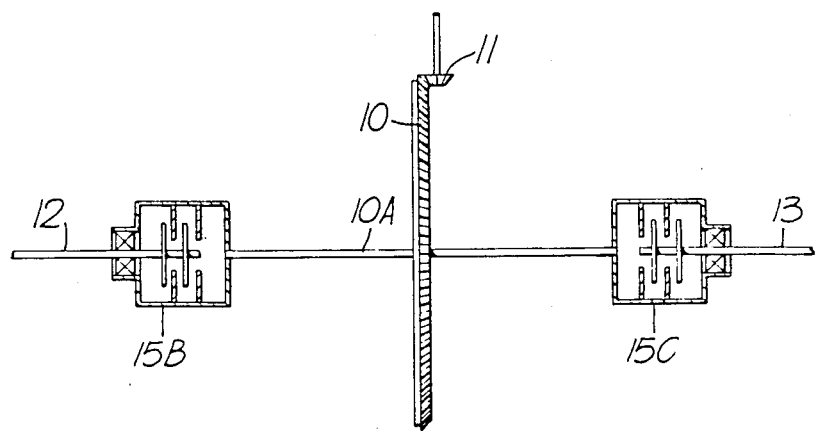
FIG. 4 is a diagramatic representation of a modification of the arrangement of FIG. 1.

In FIG. 4, the axle may be regarded as consisting of drive shaft means 12 and 13 each incorporating an inline viscous fluid coupling means 15B and 15C respectively. These drive shaft means are in driving connection with a common rotatable member consisting of a further drive shaft 10A which carries the crown wheel 10. Each of the viscous fluid coupling means 15B and 15C is constructed using the same principles incorporated in the FIG. 1 arrangement, and as taught in our British Patent Specification No. 1 357 106. The axle of FIG. 4 operates in a manner similar to that of FIG. 1.

It will be appreciated that various alternative drive transmission layouts incorporating the present invention are possible. For example, the final drive 34 of FIG. 5 incorporating a differential gear may be disposed at the front of the vehicle, with the viscous fluid coupling means 14 at the rear. Also, for example in heavy vehicles, one of the axles in a 'tandem' arrangement may incorporate a differential gear and the second axle may incorporate a viscous fluid coupling means as in FIG. 1.

We claim:

1. A motor vehicle drive transmission comprising, in combination:
    first and second drive axle assemblies having respective drive input members and respective road wheels;
    drive line means arranged for delivering positive drive simultaneously to each of said drive input members and with fixed speed-difference therebetween;
    positive drive differential gear means arranged in one of said drive axle assemblies for transmitting drive torque differentially and positively from the associated drive input member to the associated road wheels; and
    slip coupling means arranged in the other of said drive axle assemblies for transmitting drive torque from the associated drive input member to the associated road wheels, the slip coupling means being arranged to provide by slip action both intra-axle differential rotation between its associated road wheels and inter-axle differential rotation between such associated wheels and the road wheels of said one drive axle assembly while avoiding positive drive differential gear means arranged in the other of said drive axle assemblies.

2. A motor vehicle drive transmission as claimed in claim 1, wherein said slip coupling means comprises a viscous fluid coupling with mutually interleaved annular plates arranged to define a plurality of sets of annular plates associated respectively with the road wheels of said other of said drive axle assemblies, said annular plates being enclosed with viscous fluid occupying a predetermined percentage less than the volume of space available for fluid at 25 degrees Centigrade, and at least some of the annular plates having faces defining a circular array of outwardly extending slots.

3. A motor vehicle drive transmission as claimed in claim 2, wherein said viscous fluid coupling means further comprises a housing defining an enclosure of generally hollow cylindrical configuration and said housing is common to the said plurality of sets of annular plates.

4. A motor vehicle drive transmission as claimed in claim 1, wherein the road wheels of said other of said drive axle assemblies are steerable front road wheels.

5. A motor vehicle drive transmission as claimed in claim 4, wherein said other of said drive axle assemblies has two drive shafts one each from opposite outputs of said slip coupling means to the associated steerable front road wheel, and said two drive shafts being of substantially equal length.

6. A component part for use in a motor vehicle drive transmission as claimed in claim 1, said component part constituting said slip coupling means and comprising an immediately-responsive torque-transmitting viscous fluid coupling having a housing defining an enclosure of generally hollow cylindrical configuration, mutually interleaved annular plates enclosed within said housing arranged therein to define a plurality of sets of annular plates for association, when put into use, by driving connection respectively with the road wheels of a drive axle assembly, the said annular plates being enclosed with viscous fluid occupying a predetermined percentage less than the volume of space available for fluid at 25 degrees Centigrade, and at least some of the annular plates having faces defining a circular array of outwardly extending slots.

7. A vehicle drive transmission comprising:
    a gearbox,
    a first drive axle assembly having associated road wheels and having a first input member and two first half shafts connected respectively to the associated road wheels and first differential drive means arranged for transmitting torque between the first input member and the first half shafts,
    a second drive axle assembly having associated road wheels and having a second input member and two second half shafts connected respectively to the associated road wheels, and second differential drive means arranged for transmitting torque between the second input member and the second half shafts,
    torque transmitting means connecting the gearbox with the first and second input members for transmitting torque therebetween so that there is a fixed speed relation between the first and second input members, the first differential drive means being a differential gear means for transmitting torque differentially and positively between the first input member and the first half shafts, and
    the second differential drive means being slip coupling means for permitting by slip differential rotation between the road wheels of the second axle assembly; differential rotation between each of these road wheels and the second input member and for transmitting torque between the second input member and either associated road wheel when a speed difference exists therebetween and differential rotation between the road wheels of said second axle and the road wheels of said first axle.

8. A vehicle drive transmission comprising:
    first and second drive axle assemblies having respective drive input members and respective road wheels,
    drive means arranged for delivering drive simultaneously to each of said drive input members and with a fixed speed relation therebetween,
    differential gear means arranged in one of said drive axle assemblies for transmitting torque differentially and positively between the associated drive input member and the associated road wheels,
    and whereby, said slip coupling means provides for intra-axle differential rotation between its associated wheels and inter-axle differential rotation between its associated wheels and the wheels of said first axle slip coupling means arranged in the other of said drive axle assemblies for transmitting torque between the associated drive input member and either associated road wheel when a speed difference exists between the said input member and such road wheel, the slip coupling means being constructed for transmitting torque sufficient to effect useful drive at the associated road wheels immediately in response to slip induced by an onset of wheel spin at either of the road wheels associated with the said one drive axle assembly.

9. A vehicle drive transmission comprising:
first and second drive axle assemblies having respective drive input members and respective road wheels, drive means arranged for delivering drive simultaneously to each of said drive input members and with a fixed speed relation therebetween, differential gear means arranged in one of said drive axle assemblies for transmitting torque differentially and positively between the associated drive input member and the associated road wheels,
and slip coupling means arranged in the other of said drive axle assemblies for transmitting torque between the associated drive input member and either associated road wheel when a speed difference exists between the said input member and such road wheel whereby, said slip coupling means provides for intra-axle differential rotation between its associated wheels and inter-axle differential rotation between its associated wheels and the wheels of said first axle.

10. Slip coupling means for use in a vehicle drive transmission as claimed in any one of claims 7, 8 or 9, the slip coupling means comprising a housing defining an enclosure generally of hollow cylindrical configuration, three sets of annular plates in the housing, one of said sets being positively engaged for driving by the housing, the others of said sets being in positive driving connection respectively with the associated road wheels, the plates of the said other sets being freely interleaved with the plates of the said one set, and all of said plates being sealed within said enclosure in contact with a viscous fluid occupying a predetermined percentage less than the volume of space available for fluid within the housing.

11. A vehicle drive transmission comprising:
a gearbox,
a first drive axle assembly having associated road wheels and having a first input member and two first half shafts connected respectively to the associated road wheels and first differential drive means arranged for transmitting torque between the first input member and the first half shafts, a second drive axle assembly having associated road wheels and having a second input member and two second half shafts connected respectively to the associated road wheels and second differential drive means arranged for transmitting torque between the second input member and the second half shafts,
torque transmitting means connecting the gearbox with the first and second input members for transmitting torque therebetween so that there is a fixed speed relation between the first and second input members, the first differential drive means being a gear differential, and the second differential drive means being a slip differential comprising a housing driven by the said second input member, three sets of annular plates in the housing, one of said sets being driven by the housing and the others of said sets being connected respectively to the second half shafts, the plates of the said other sets being interleaved with the plates of the said one set, and the housing containing a viscous fluid in contact with the annular plates and occupying at least 86% of the space available for fluid within the housing whereby, said slip differential provides for intra-axle differential rotation between its associated wheels and inter-axle differential rotation between its associated wheels and the wheels of said first axle.

12. A vehicle drive transmission comprising:
a gearbox,
a first drive axle assembly having associated road wheels and having a first input member and two first half shafts connected respectively to the associated road wheels and first differential drive means arranged for transmitting torque between the first input member and the first half shafts,
a second drive axle assembly having associated road wheels and having a second input member and two second half shafts connected respectively to the associated road wheels and second differential drive means arranged for transmitting torque between the second input member and the second half shafts,
torque transmitting propeller shaft means providing direct positive drive connections between the gearbox and the first and second input members for transmitting torque therebetween so that there is a fixed speed relation between the first and second input members,
the first differential drive means being a gear differential, and the second differential drive means being a slip differential comprising viscous shear coupling means having three relatively rotatable members of which one is connected to the second input member and the others are connected respectively to the second half shafts whereby said slip differential provides for intra-axle differential rotation between its associated wheels and inter-axle differential rotation between its associated wheels and the wheels of said first axle.

13. A vehicle incorporating a drive transmission as claimed in any one of claims 7, 11, 12, 8 or 9.

14. A vehicle drive transmission comprising a first drive axle consisting essentially of first input gearing, a gear differential having an input and two outputs, the differential input being driven by the input gearing, and two first half shafts connected respectively to the two differential outputs and arranged to drive associated roadwheels; a second drive axle consisting essentially of second input gearing, a slip differential driven by said second input gearing, the slip differential having an input and two outputs and consisting essentially of viscous shear coupling means having three relatively rotatable members one of which forms the coupling input and the other two of which form the coupling outputs, the coupling input being positively connected to the second input gearing; and two second half shafts positively connected respectively to the outputs of the slip differential, and drive means arranged to drive the first and second input gearing without slip and so that there is always a fixed rotary speed relation between the respective inputs of the gear differential and the slip differential, whereby said slip differential provides for intraaxle differential rotation between its associated roadwheels and inter-axle differential rotation between its associated roadwheels and the roadwheels of said first drive axle.

* * * * *

UNITED STATES PATENT AND TRADEMARK OFFICE
CERTIFICATE OF CORRECTION

PATENT NO. : 4,721,010

DATED : January 26, 1988

INVENTOR(S) : Anthony J. Sheldon, et al.

It is certified that error appears in the above-identified patent and that said Letters Patent is hereby corrected as shown below:

On the face of the patent, "1498061 Great Britain" should be added under foreign patents.

Col. 3, line 22 "the" (first occurrence) should be --with--.

Col. 6, lines 64-68 "whereby, said slip coupling means provides for intra-axle differential rotation between its associated wheels and inter-axle differential rotation between its associated wheels and the wheels of said first axle" should be moved to Col. 7, line 10 after --axle assembly--.

Col. 8, line 64 "intraaxle" should be --intra-axle--.

Signed and Sealed this

Ninth Day of May, 1989

Attest:

DONALD J. QUIGG

*Attesting Officer*     *Commissioner of Patents and Trademarks*